(12) United States Patent
Ikegami

(10) Patent No.: US 9,097,895 B2
(45) Date of Patent: Aug. 4, 2015

(54) OPTICAL DEFLECTOR INCLUDING MIRROR WITH RECESSED RIB ON ITS REAR SURFACE

(71) Applicant: STANLEY ELECTRIC CO., LTD., Meguro-ku, Tokyo (JP)

(72) Inventor: Keiichi Ikegami, Hachioji (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 59 days.

(21) Appl. No.: 14/023,171

(22) Filed: Sep. 10, 2013

(65) Prior Publication Data
US 2014/0071512 A1   Mar. 13, 2014

(30) Foreign Application Priority Data
Sep. 11, 2012 (JP) .................................. 2012-199385

(51) Int. Cl.
   G02B 26/08   (2006.01)
(52) U.S. Cl.
   CPC ............ G02B 26/0833 (2013.01); *G02B 26/08* (2013.01)
(58) Field of Classification Search
   CPC ........................................................ G02B 26/08
   USPC .......... 359/196.1, 197.1, 223.1, 224.1, 212.1, 359/212.2, 213.1, 214.1, 201.2
   See application file for complete search history.

(56) References Cited

U.S. PATENT DOCUMENTS

2012/0162739 A1* 6/2012 Yamada ..................... 359/212.1

FOREIGN PATENT DOCUMENTS

| JP | 07-092409 A | 4/1995 |
| JP | 2001-249300 A | 9/2001 |
| JP | 2010-128116 A | 6/2010 |

OTHER PUBLICATIONS

Extended European Search Report (EESR) dated Nov. 18, 2013 (in English) issued in counterpart European Application No. 13020090.0.

* cited by examiner

*Primary Examiner* — Scott J Sugarman
*Assistant Examiner* — William R Alexander
(74) *Attorney, Agent, or Firm* — Holtz, Holtz, Goodman & Chick PC

(57) ABSTRACT

In an optical deflector including a mirror, a rib formed at an outer circumference of the mirror, a support frame surrounding the mirror, at least one torsion bar arranged along an axis of the mirror and coupled between the support frame and the mirror, and a pair of actuators arranged between the support frame and the torsion bar, a recess opposing the torsion bar is formed within the rib.

11 Claims, 12 Drawing Sheets

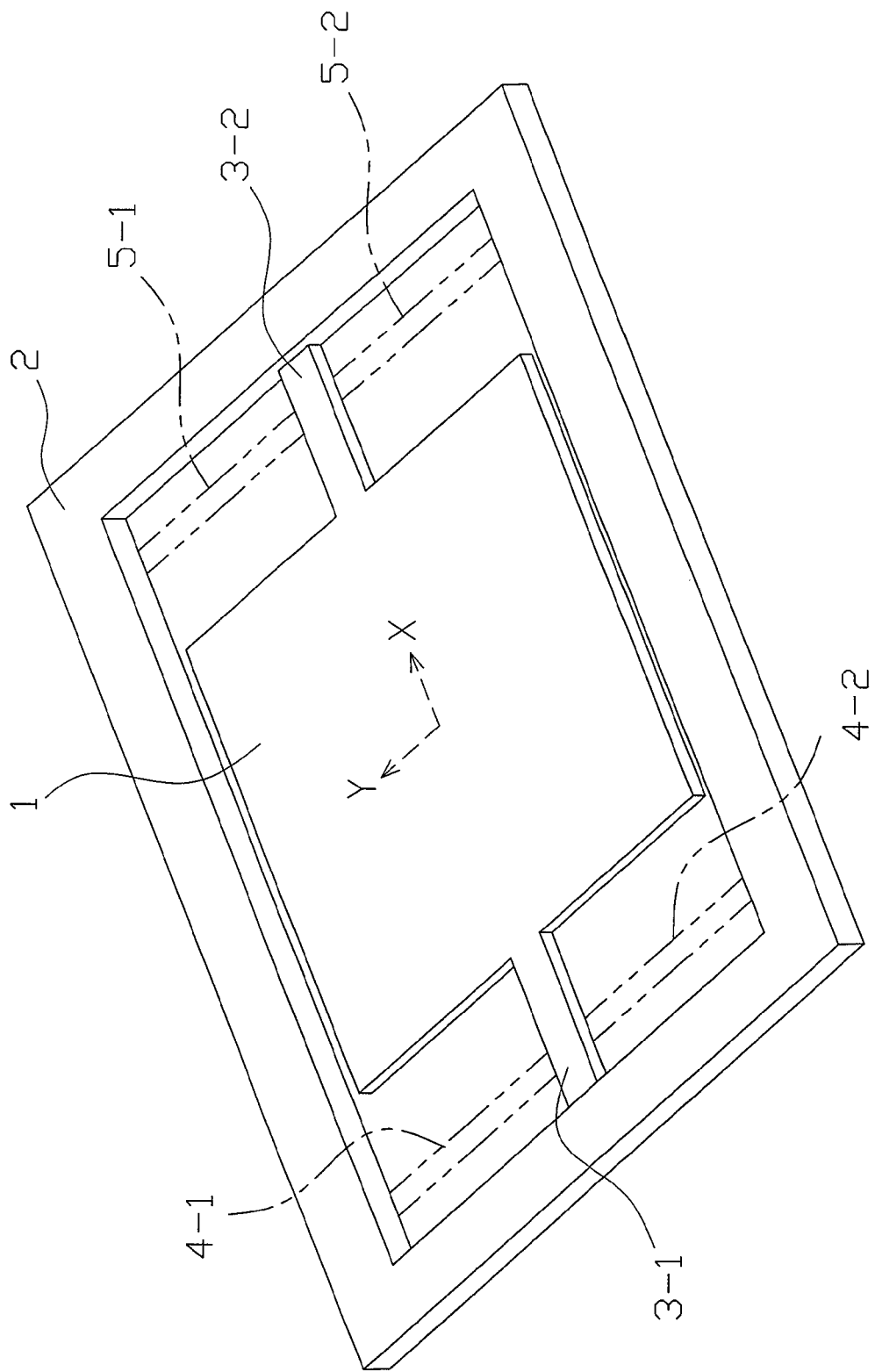

- ■ $90e^6 \sim 100e^6$ Pa
- ▨ $60e^6 \sim 90e^6$ Pa
- ▦ $40e^6 \sim 60e^6$ Pa
- ▫ $10e^6 \sim 40e^6$ Pa
- □ $0 \sim 10e^6$ Pa 90e⁶ ~ 100e⁶ Pa
60e⁶ ~ 90e⁶ Pa
40e⁶ ~ 60e⁶ Pa
10e⁶ ~ 40e⁶ Pa
0 ~ 10e⁶ Pa

| | |
|---|---|
| ■ | $90e^6 \sim 100e^6$ Pa |
| ▨ | $60e^6 \sim 90e^6$ Pa |
| ▦ | $40e^6 \sim 60e^6$ Pa |
| ▒ | $10e^6 \sim 40e^6$ Pa |
| □ | $0 \sim 10e^6$ Pa |

90e⁶ ~ 100e⁶ Pa
60e⁶ ~ 90e⁶ Pa
40e⁶ ~ 60e⁶ Pa
10e⁶ ~ 40e⁶ Pa
0 ~ 10e⁶ Pa

90e⁶ ~ 100e⁶ Pa
60e⁶ ~ 90e⁶ Pa
40e⁶ ~ 60e⁶ Pa
10e⁶ ~ 40e⁶ Pa
0 ~ 10e⁶ Pa

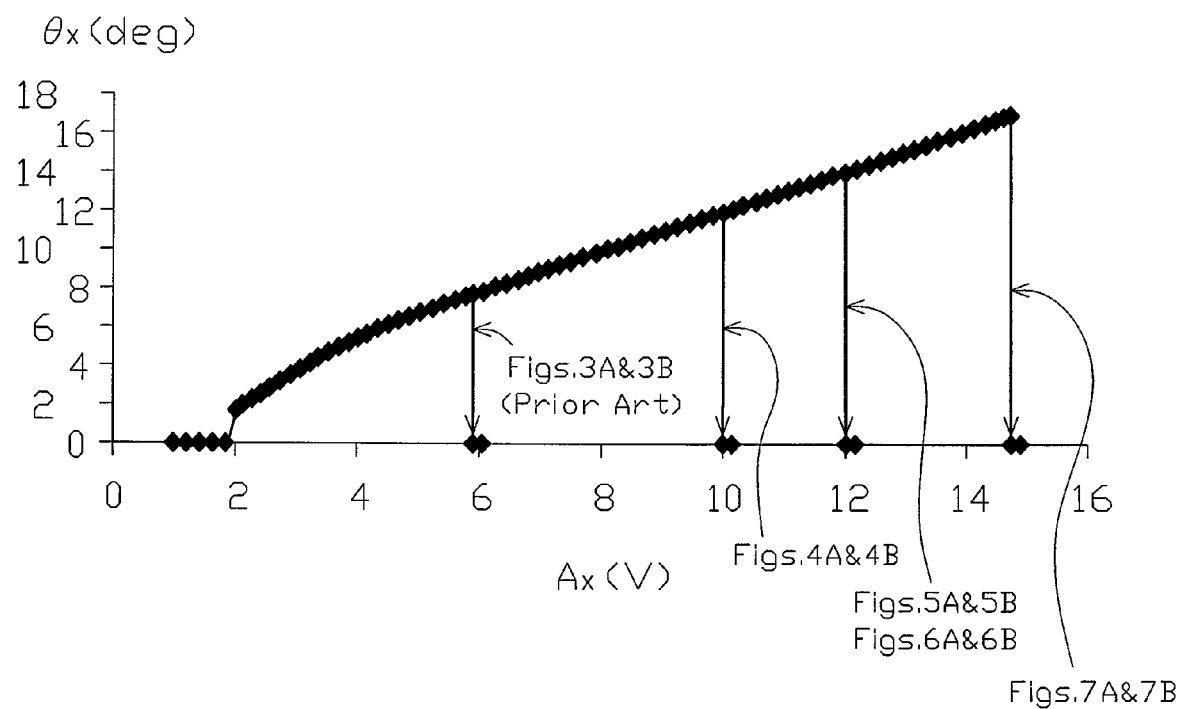

OPTICAL DEFLECTOR INCLUDING MIRROR WITH RECESSED RIB ON ITS REAR SURFACE

This application claims the priority benefit under 35 U.S.C. §119 to Japanese Patent Application No. JP2012-199385 filed on Sep. 11, 2012, which disclosure is hereby incorporated in its entirety by reference.

BACKGROUND

1. Field

The presently disclosed subject matter relates to an optical deflector used as a scanner in a projector, a bar code reader, a laser printer, a laser read amplifier, a head-up display apparatus or the like.

2. Description of the Related Art

Recently, in a projector or the like, a spotlight is deflected by an optical deflector and then, is projected on a screen. Such an optical deflector is a micro electro mechanical system (MEMS) device manufactured by semiconductor manufacturing processes and micro machine technology.

FIG. 1 is a perspective view illustrating a first prior art optical deflector viewed from its rear surface (see: FIG. 16 of JP2001-249300A). In FIG. 1, an optical deflector, which is of a one-dimensional type, is constructed by a square mirror 1, a support frame 2 surrounding the mirror 1, a pair of torsion bars 3-1 and 3-2 connected between the support frame 2 and the mirror 1, and two pairs of piezoelectric actuators 4-1, 4-2 and 5-1, 5-2 provided between the support frame 2 and the torsion bars 3-1 and 3-2 for vibrating (rocking) the mirror 1 through the torsion bars 3-1 and 3-2 with respect to an X-axis of the mirror 1. In this case, both of the mirror 1 and the torsion bars 3-1 and 3-2 are very thin, while the support frame 2 is much thicker than the mirror 1 and the torsion bars 3-1 and 3-2.

When a simulation using the Oofelie-Multiphysics V4.4 (trademark) simulation software provided by Open Engineering was performed upon the optical deflector of FIG. 1, a stress distribution as illustrated in FIGS. 2A and 2B was obtained in the optical deflector of FIG. 1. In FIGS. 2A and 2B, the stronger stress (in this case, Mises stress), whether it is a compression stress or a tension stress, is shown as darker in the illustration.

In FIGS. 2A and 2B, the stress distribution can be represented by a rear-side stress distribution $D_R$ viewed from the rear surface of the optical deflector and a front-side stress distribution $D_F$ viewed from the front surface of the optical deflector. That is, as shown in FIG. 2B, the rear-side stress distribution $D_R$ was symmetrical to the front-side stress distribution $D_F$ with respect to a center face therebetween. If this condition is defined as Condition I, the stress distribution of FIGS. 2A and 2B satisfied Condition I.

Determination of whether or not Condition I is satisfied is carried out as follows: A predetermined area is divided into a plurality of grid-shaped cells. Then, it is determined whether or not the difference between a stress within one cell on a rear-side surface and a stress within one cell on a front-side surface corresponding to the one cell on the rear-side surface is smaller than a threshold value. Then, the number of cells whose difference is smaller than the threshold value is calculated. Then, it is determined whether or not the ratio of the calculated cell number is smaller than a predetermined ratio. Finally, when the ratio of the calculated cell number is smaller than the predetermined ratio, Condition I is determined to be satisfied.

Also, the slope of the stress in the rear-side stress distribution $D_R$ at a coupling region C between the mirror 1 and the torsion bar 3-1 was smaller than a predetermined value. This condition is defined as Condition II which can be used instead of the above-mentioned Condition I.

Further, the maximum stress in the rear-side stress distribution $D_R$ at the coupling region C was smaller than a predetermined value. This condition is defined as Condition III.

Since the optical deflector of FIGS. 2A and 2B satisfied Condition I (or II) and Condition III, it is determined that the mirror 1 and the torsion bar 3-1 at the coupling region C would not break down even when the deflection angle of the mirror 1 is large.

In the above-described first prior art optical deflector, however, as shown in FIGS. 2A and 2B, the relatively large stress was spread isotropically and broadly into the mirror 1 along the X-axis and the Y-axis due to the thin structure thereof. As a result, the mirror 1 per se would warp, so that the optical characteristics of reflected light from the mirror 1 would deteriorate, and at worst, the mirror 1 entirely would break down.

In a second prior art optical deflector (see: JP07-092409), the mirror is much thicker than the torsion bars to reinforce the mirror. That is, the spread of the relatively large stress into the mirror can be suppressed by the thick structure thereof to avoid the warping of the mirror.

In the above-described second prior art optical deflector, however, the weight of the mirror is such as to require larger drive voltages for piezoelectric actuators or the like.

In a third prior art optical deflector, a rib is formed at an outer circumference of a rear surface of a thin mirror in the vicinity of a torsion bar (see: FIG. 2 of JP2010-128116A) or at the entire outer circumference of the rear surface of the mirror (see: FIG. 3 of JP2010-128116A). As a result, while the reinforcement of the mirror is retained, the weight of the mirror is suppressed, which would not require larger drive voltages for piezoelectric actuators or the like.

FIG. 3A is a perspective view illustrating a mirror and a torsion bar of the third prior art optical deflector, and FIG. 3B is a cross-sectional view taken along the line B-B in FIG. 3A. In this case, the portions of the optical deflector of FIGS. 3A and 3B other than the mirror 1 are the same as those of FIG. 1.

In FIGS. 3A and 3B, a rib 1a is formed at an outer circumference of the mirror 1, so that the mirror 1 and the torsion bar 3-1 at their coupling region C would break down. This is discussed below.

When a simulation using the Oofelie-Multiphysics V4.4 (trademark) simulation software provided by Open Engineering was performed upon the optical deflector of FIGS. 3A and 3B, a stress distribution as illustrated in FIGS. 3A and 3B was obtained. That is, the spread of a relatively large stress into the mirror 1 is suppressed by the rib 1a.

In the above-described third prior art optical deflector, however, a rear-side stress distribution $D_R$ was asymmetrical to a front-side stress distribution $D_F$ to generate a large asymmetrical region AS illustrated in FIG. 3B. Also, a large slope of stress at the coupling region C would be generated as indicated by Sa. Further, the maximum stress in the rear-side stress distribution $D_R$ is large as indicated by Ma. Therefore, since the optical deflector of FIGS. 3A and 3B did not satisfy Condition I (or II) and Condition III, the mirror 1 and the torsion bar 3-1 at the coupling region C would break down even when the deflection angle of the mirror 1 is small (see: $\theta_x=8°$ of FIG. 8).

Another prior art optical deflector forms a plurality of recessed portions within a thick mirror (see: JP2001-

249300A). As a result, while the reinforcement of the mirror is retained, the weight of the mirror is suppressed, which would not require larger drive voltages for piezoelectric actuators or the like. However, this prior art optical deflector has the same problems as in the above-described third prior art optical deflector.

SUMMARY

The presently disclosed subject matter seeks to solve one or more of the above-described problems.

According to the presently disclosed subject matter, in an optical deflector including a mirror, a rib formed at an outer circumference of the mirror, a support frame surrounding the mirror, at least one torsion bar arranged along an axis of the mirror and coupled between the support frame and the mirror, and a pair of actuators arranged between the support frame and the torsion bar, a recess opposing the torsion bar is formed within the rib.

According to the presently disclosed subject matter, while the spread of a relatively large stress broadly into the mirror is suppressed by the rib, such a relatively large stress is spread isotropically into the mirror at the recess within the rib. Therefore, Condition I (or II) and Condition III would be satisfied, thus avoiding the breakdown of the mirror and the torsion bar at their coupling region even when the deflection angle of the mirror is large.

BRIEF DESCRIPTION OF THE DRAWINGS

The above and other advantages and features of the presently disclosed subject matter will be more apparent from the following description of certain embodiments, as compared with the prior art, taken in conjunction with the accompanying drawings, wherein:

FIG. 1 is a perspective view illustrating a first prior art optical deflector viewed from its rear surface;

FIG. 8 is a graph showing the relationship between the amplitude of sinusoidal-wave drive voltages applied to the piezoelectric actuators and the deflection angle of the mirrors of FIGS. 3A and 3B, FIGS. 4A and 4B, FIGS. 5A and 5B, FIGS. 6A and 6B and FIGS. 7A and 7B;

DETAILED DESCRIPTION OF EXEMPLARY EMBODIMENTS

Figure 4A:
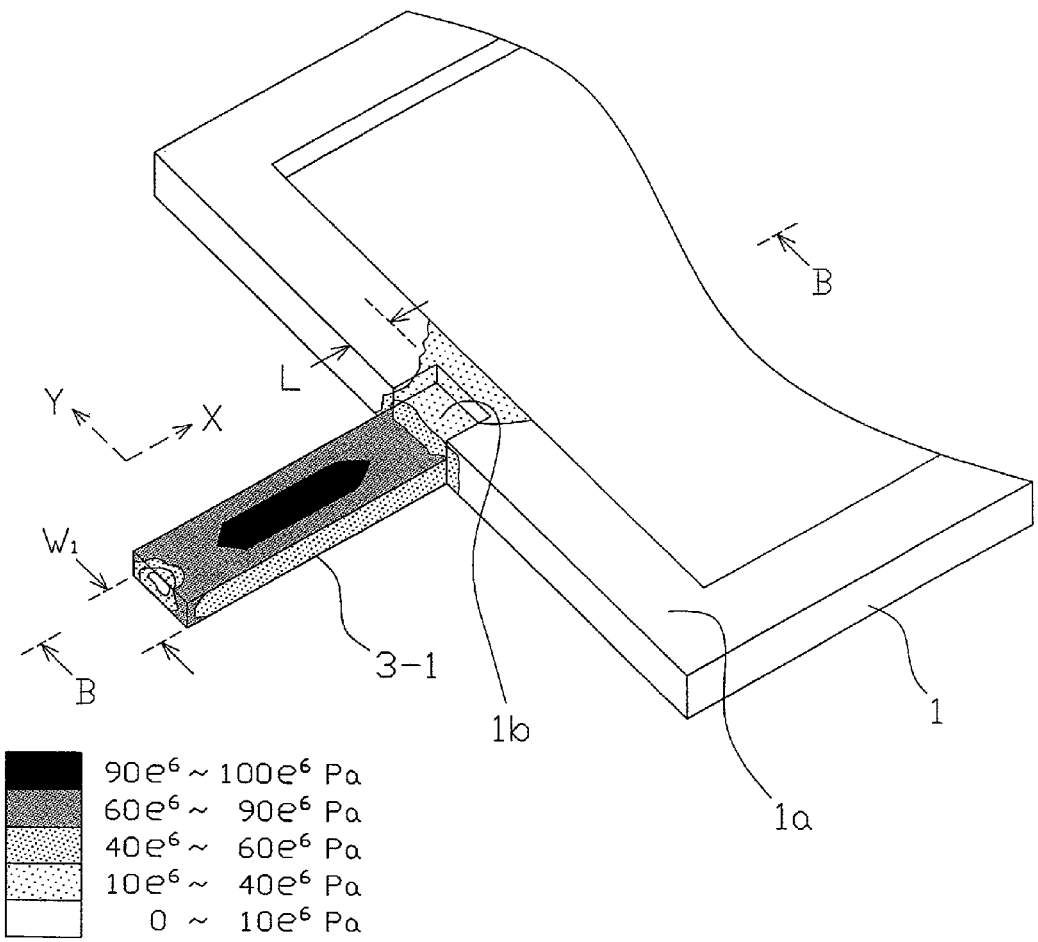
FIG. 4A is a perspective view illustrating a mirror and a torsion bar of a first embodiment of the optical deflector according to the presently disclosed subject matter with a simulated stress distribution.
Figure 4B:
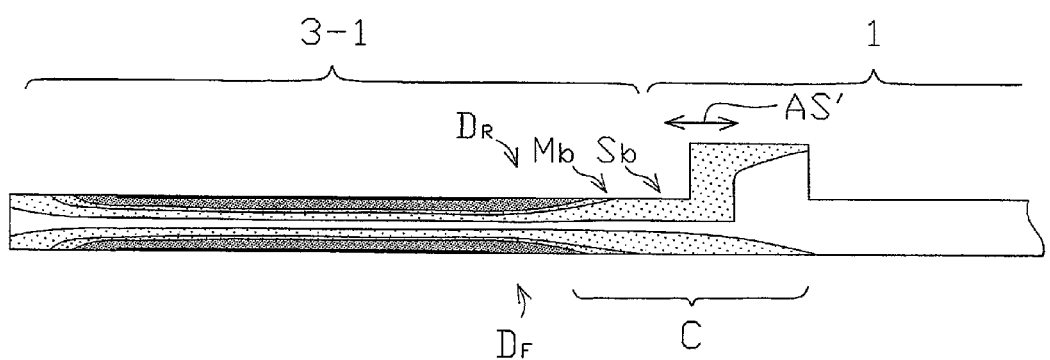
FIG. 4B is a cross-sectional view taken along the line B-B in FIG. 4A.

FIG. 4A is a perspective view illustrating a mirror and a torsion bar of a first embodiment of the optical deflector according to the presently disclosed subject matter with a simulated stress distribution, and FIG. 4B is a cross-sectional view taken along the line B-B in FIG. 4A. In FIGS. 4A and 4B, only the mirror 1 and the torsion bar 3-1 are illustrated, and the other portions than the mirror 1 are the same as those of the optical deflector of FIG. 1.

Figure 2A:
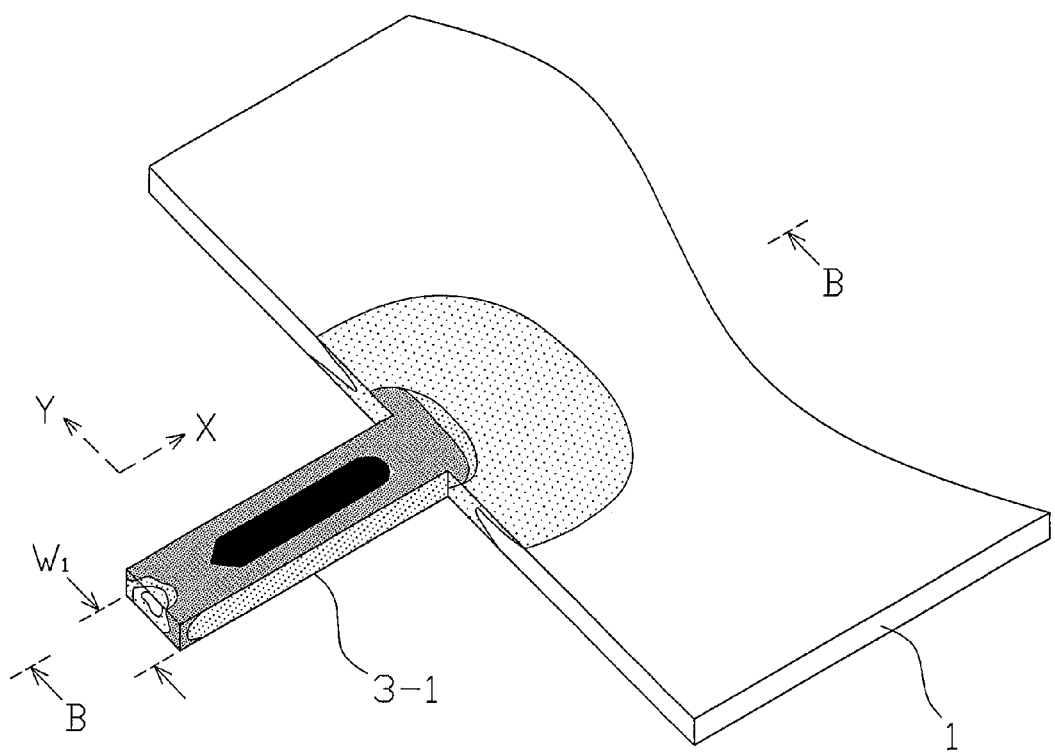
FIG. 2A is a perspective view of the mirror and the torsion bar of FIG. 1 with a simulated stress distribution.
Figure 2B:
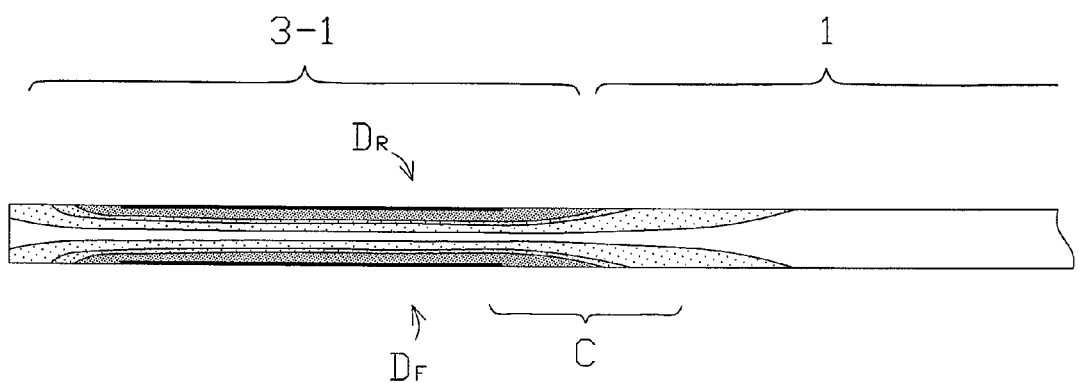
FIG. 2B is a cross-sectional view taken along the line B-B in FIG. 2A.
Figure 3A:
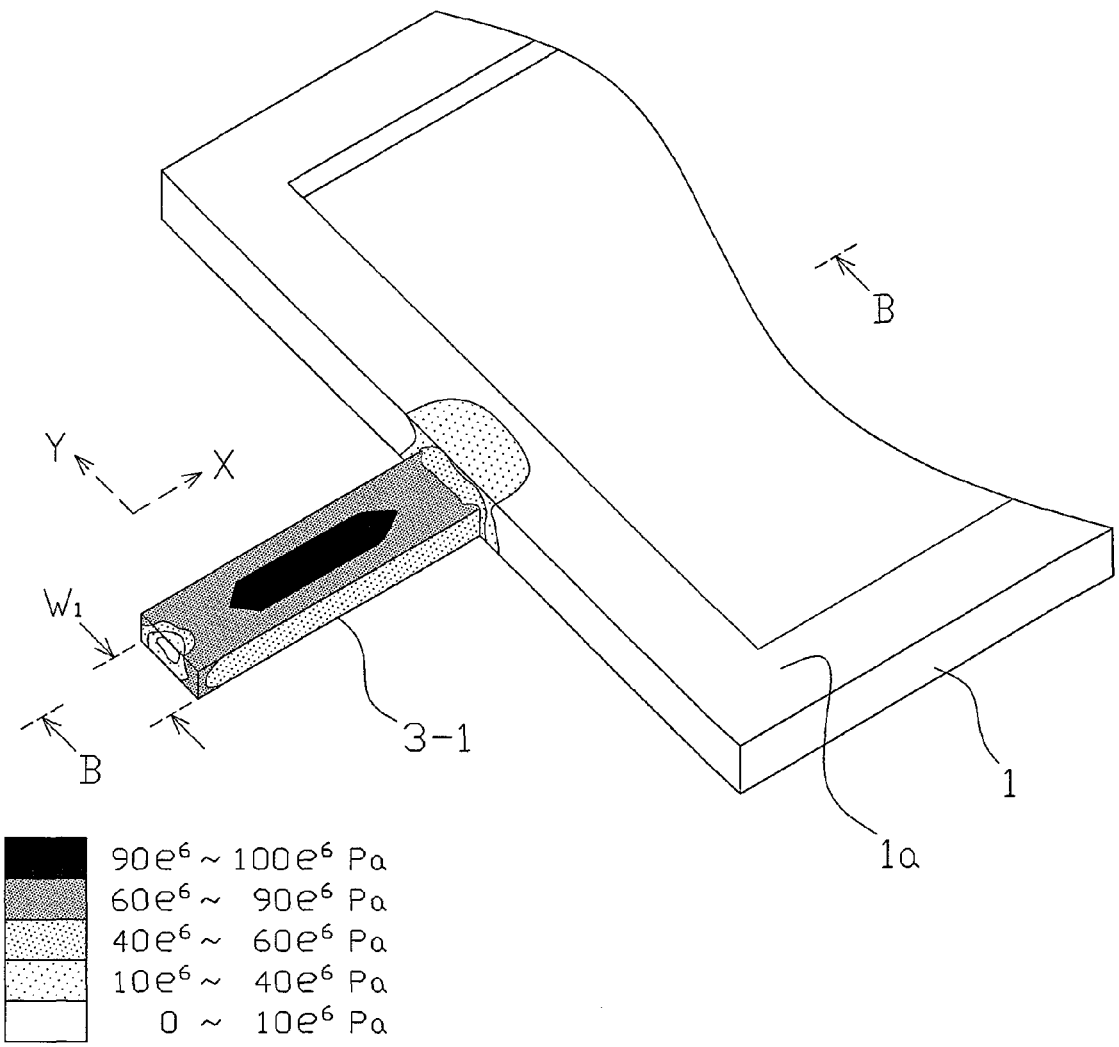
FIG. 3A is a perspective view of a mirror and a torsion bar of a third prior art optical deflector with a simulated stress distribution.
Figure 3B:
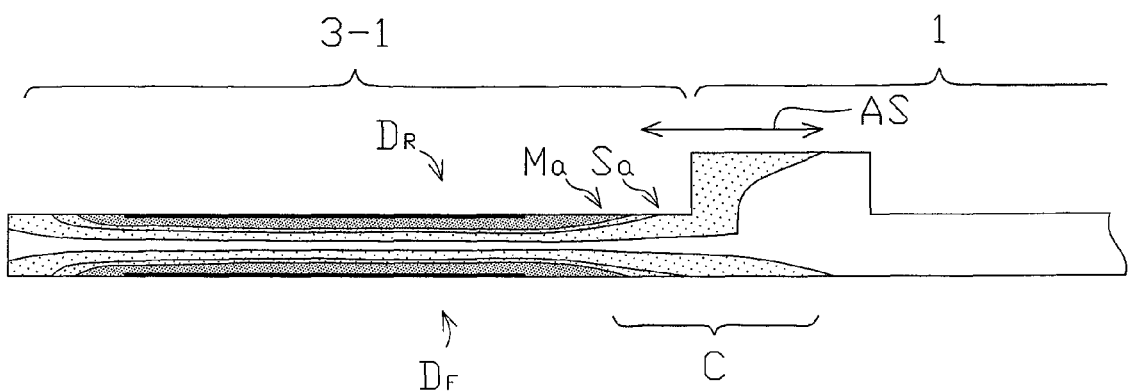
FIG. 3B is a cross-sectional view taken along the line B-B in FIG. 3A.

In FIGS. 4A and 4B, a recess 1*b* opposing the torsion bar 3-1 is formed within the rib 1*a* of FIGS. 3A and 3B. The recess 1*b* has the same width as the width $W_1$ of the torsion bar 3-1, and a relatively small length L which is about one-twentieth of the length of the mirror 1. In this case, the thickness of the mirror 1 at the recess 1*b* is the same as that of the torsion bar 3-1, i.e., thin.

When a simulation using the Oofelie-Multiphysics V4.4 (trademark) simulation software provided by Open Engineering was performed upon the optical deflector of FIGS. 4A and 4B, a stress distribution as illustrated in FIGS. 4A and 4B was obtained. The spread of a relatively large stress into the mirror 1 is suppressed by the rib 1*a*; however, such a relatively large stress is still slightly spread isotropically into the mirror 1 along both of the X-axis and the Y-axis due to the presence of the recess 1*b* within the rib 1*a* at the coupling region C.

In FIG. 4B, a rear-side stress distribution $D_R$ is somewhat asymmetrical to a front-side stress distribution $D_F$ to generate a small asymmetrical region AS'. Also, the slope of stress at the coupling region C would not be so large as indicated by $S_b$. Further, the maximum stress in the rear-side stress distribution $D_R$ is not so large as indicated by $M_b$. However, the optical deflector of FIGS. 4A and 4B still satisfied Condition I (or II) and Condition III. Therefore, the mirror 1 and the torsion bar 3-1 at their coupling region C would not break down even when the deflection angle of the mirror 1 is large (see: $\theta_x = 12°$ of FIG. 8).

Figure 5A:
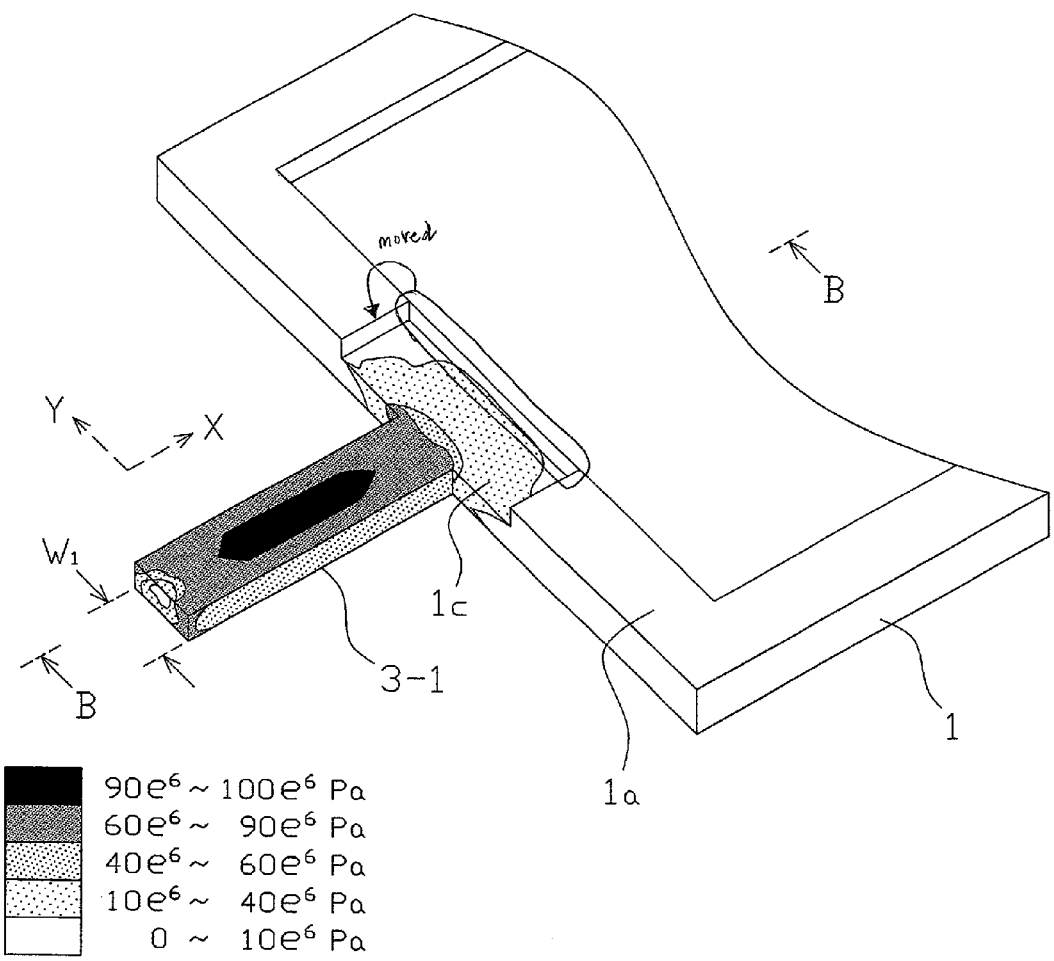
FIG. 5A is a perspective view illustrating a mirror and a torsion bar of a second embodiment of the optical deflector according to the presently disclosed subject matter with a simulated stress distribution.
Figure 5B:
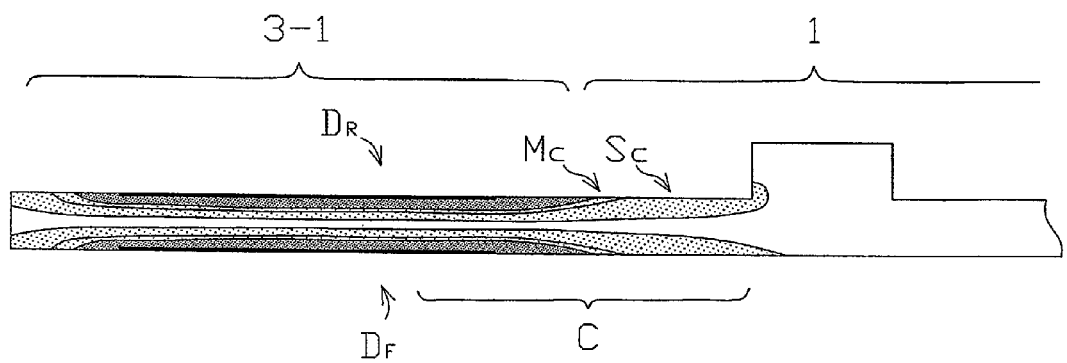
FIG. 5B is a cross-sectional view taken along the line B-B in FIG. 5A.

FIG. 5A is a perspective view illustrating a mirror and a torsion bar of a second embodiment of the optical deflector according to the presently disclosed subject matter with a simulated stress distribution, and FIG. 5B is a cross-sectional view taken along the line B-B in FIG. 5A. Even in FIGS. 5A and 5B, only the mirror 1 and the torsion bar 3-1 are illustrated, and the other portions than the mirror 1 are the same as those of the optical deflector of FIG. 1.

In FIGS. 5A and 5B, a recess 1c opposing the torsion bar 3-1 is formed within the rib 1a of FIGS. 3A and 3B. The recess 1c has a width (>$W_1$) larger than the width $W_1$ of the torsion bar 3-1 although the length of the recess 1c along the X-axis is not large. In this case, the thickness of the mirror 1 at the recess 1c is the same as that of the torsion bar 3-1.

When a simulation using the Oofelie-Multiphysics V4.4 (trademark) simulation software provided by Open Engineering was performed upon the optical deflector of FIGS. 5A and 5B, a stress distribution as illustrated in FIGS. 5A and 5B was obtained. The spread of a relatively large stress into the mirror 1 is suppressed by the rib 1a; however, such a relatively large stress is still spread isotropically into the mirror 1 at the recess 1c mainly along the Y-axis due to the presence of the wide recess 1c in the rib 1a at the coupling region C.

In FIG. 5B, a rear-side stress distribution $D_R$ was symmetrical to a front-side stress distribution $D_F$ to generate no asymmetrical region. Also, the slope of stress at the coupling region C would not be so large as indicated by $S_c$. Further, the maximum stress in the rear-side stress distribution $D_R$ was not so large as indicated by $M_c$. Therefore, the optical deflector of FIGS. 5A and 5B satified Condition I (or II) and Condition III. Thus, the mirror 1 and the torsion bar 3-1 at their coupling region C would not break down even when the deflection angle of the mirror 1 is large (see: $\theta_x$=14° of FIG. 8).

Figure 6A:
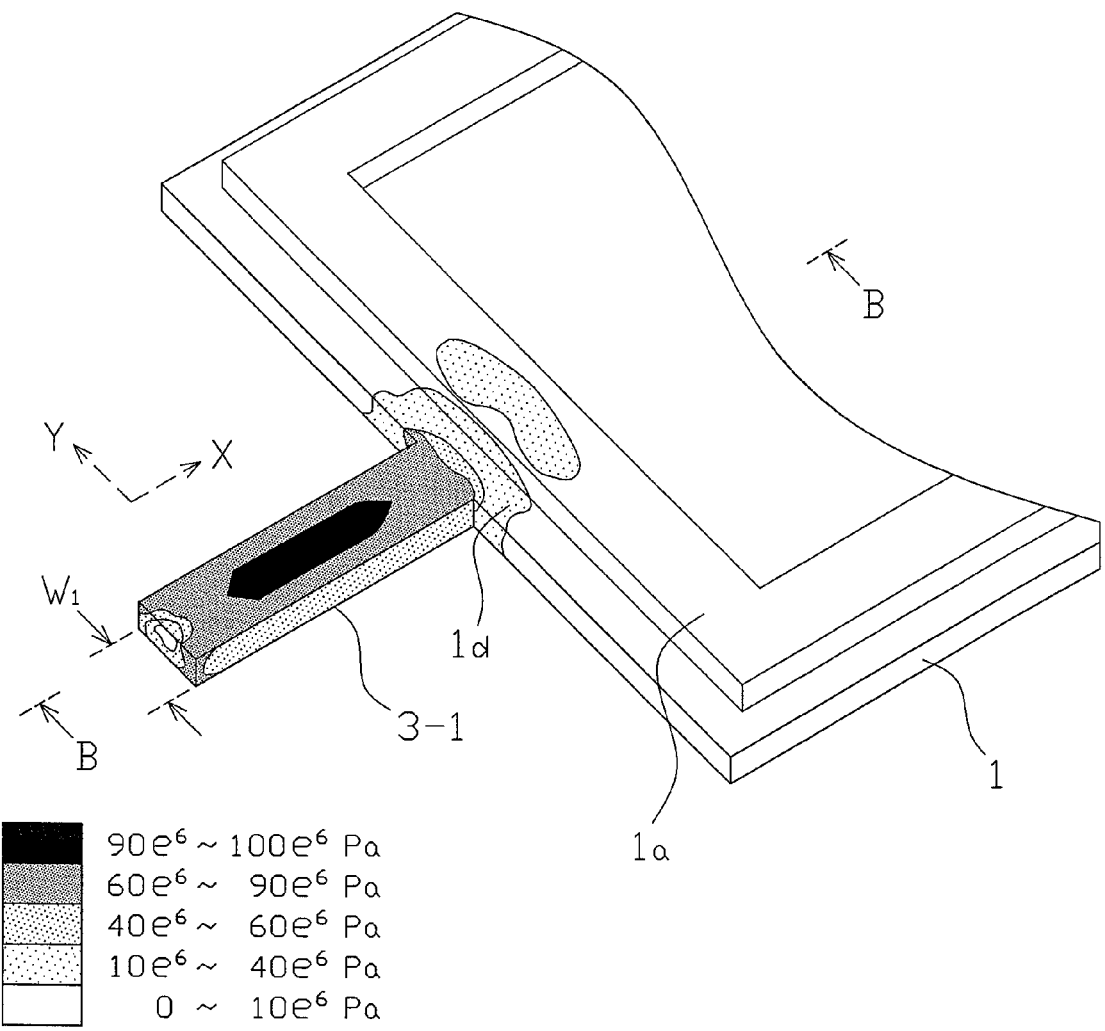
FIG. 6A is a perspective view illustrating a mirror and a torsion bar of a third embodiment of the optical deflector according to the presently disclosed subject matter with a simulated stress distribution.
Figure 6B:
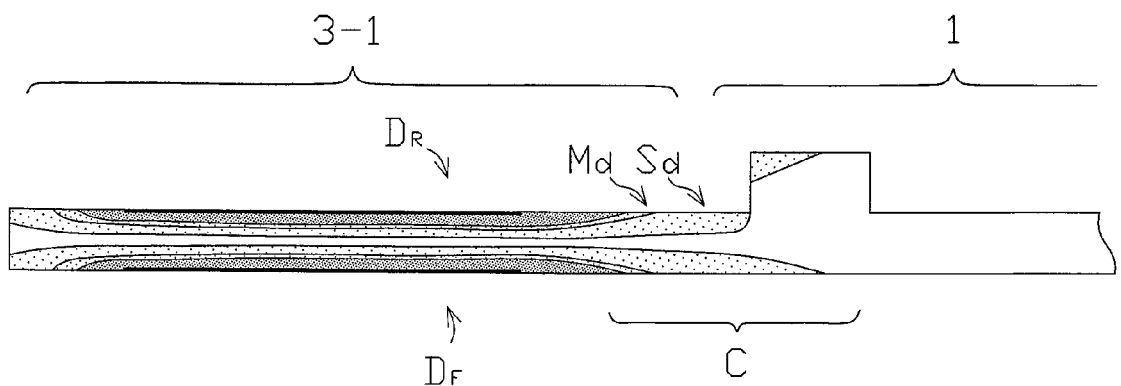
FIG. 6B is a cross-sectional view taken along the line B-B in FIG. 6A.

FIG. 6A is a perspective view illustrating a mirror and a torsion bar of a third embodiment of the optical deflector according to the presently disclosed subject matter with a simulated stress distribution, and FIG. 6B is a cross-sectional view taken along the line B-B in FIG. 6A. Even in FIGS. 6A and 6B, only the mirror 1 and the torsion bar 3-1 are illustrated, and the portions other than the mirror 1 are the same as those of the optical deflector of FIG. 1.

In FIGS. 6A and 6B, a recess 1d is formed on an outer circumference of the rib 1a of FIGS. 3A and 3B. Note that the length of the recess 1d is not large. In this case, the thickness of the mirror 1 at the recess 1d is the same as that of the torsion bar 3-1.

When a simulation using the Oofelie-Multiphysics V4.4 (trademark) simulation software provided by Open Engineering was performed upon the optical deflector of FIGS. 6A and 6B, a stress distribution as illustrated in FIGS. 6A and 6B was obtained. The spread of a relatively large stress into the mirror 1 is suppressed by the rib 1a; however, such a relatively large stress is still spread isotropically into the mirror 1 at the recess 1d mainly along the Y-axis due to the presence of the recess 1d within the rib 1a at the coupling region C.

In FIG. 6B, a rear-side stress distribution $D_R$ was symmetrical to a front-side stress distribution $D_F$ to generate no asymmetrical region. Also, the slope of stress at the coupling region C would not be so large as indicated by $S_d$. Further, the maximum stress in the rear-side stress distribution $D_R$ is not so large as indicated by $M_d$. Therefore, the optical deflector of FIGS. 6A and 6B satisfied Condition I (or II) and Condition III. Thus, the mirror 1 and the torsion bar 3-1 at the coupling region C would not break down even when the deflection angle of the mirror 1 is large (see: $\theta_x$=14° of FIG. 8).

Figure 7A:
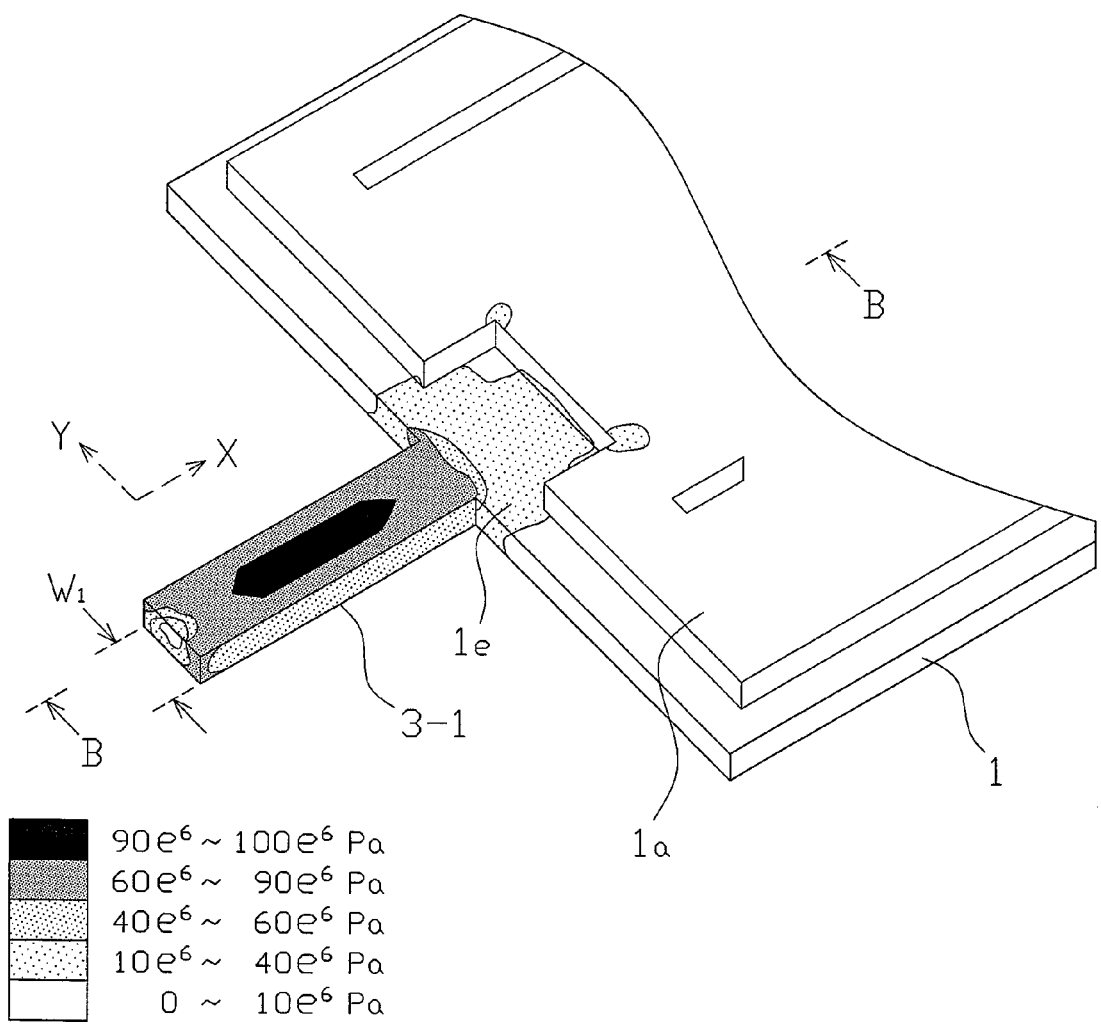
FIG. 7A is a perspective view illustrating a mirror and a torsion bar of a fourth embodiment of the optical deflector according to the presently disclosed subject matter with a simulated stress distribution.
Figure 7B:
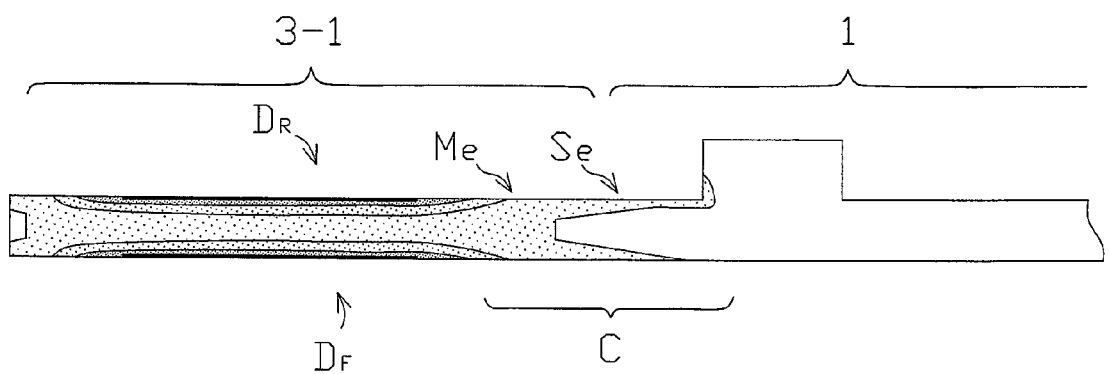
FIG. 7B is a cross-sectional view taken along the line B-B in FIG. 7A.

FIG. 7A is a perspective view illustrating a mirror and a torsion bar of a fourth embodiment of the optical deflector according to the presently disclosed subject matter with a simulated stress distribution, and FIG. 7B is a cross-sectional view taken along the line B-B in FIG. 7A. In FIGS. 7A and 7B, only the mirror 1 and the torsion bar 3-1 are illustrated, and the portions other than the mirror 1 are the same as those of the optical deflector of FIG. 1.

In FIGS. 7A and 7B, a recess 1e is obtained by enlarging the recess 1d of FIGS. 6A and 6B along the torsion bar 3-1. The recess 1e has a relatively large length along the X-axis. In this case, the thickness of the mirror 1 at the recess 1e is the same as that of the torsion bar 3-1.

When a simulation using the Oofelie-Multiphysics V4.4 (trademark) simulation software provided by Open Engineering was performed upon the optical deflector of FIGS. 7A and 7B, a stress distribution as illustrated in FIGS. 7A and 7B was obtained. The spread of a relatively large stress into the mirror 1 is suppressed by the rib 1a; however, such a relatively large stress is still spread isotropically into the mirror 1 at the recess 1e along both of the X-axis and the Y-axis due to the presence of the recess 1e within the rib 1a at the coupling region C.

In FIG. 7B, a rear-side stress distribution $D_R$ is symmetrical to a front-side stress distribution $D_F$ to generate no asymmetrical region. Also, the slope of stress at the coupling region C would not be so large as indicated by $S_e$. Further, the maximum stress in the rear-side stress distribution $D_R$ is not so large as indicated by $M_e$. Therefore, the optical deflector of FIGS. 7A and 7B satisfied Condition I (or II) and Condition III. Thus, the mirror 1 and the torsion bar 3-1 at the coupling region C would not breakdown even when the deflection angle of the mirror 1 is large (see: $\theta_x$=17° of FIG. 8).

Note that the recess 1c of FIGS. 5A and 5B can be enlarged along the torsion bar 3-1 in the same way as the recess of FIGS. 7A and 7B.

In order to operate the above-described optical deflector, when a sinusoidal-wave drive voltage $V_{xa}$ is applied to the piezoelectric actuators 4-1 and 5-1, and a sinusoidal-wave drive voltage $V_{xb}$ opposite in phase to the sinusoidal-wave drive voltage $V_{xa}$ is applied to the piezoelectric actuators 4-2 and 5-2, the mirror 1 is rocked along the X-axis through the torsion bars 3-1 and 3-2. In this case, the deflection angle $\theta_x$ of the mirror 1 can be detected by using a one-dimensional position sensitive sensor (PSD) which detects a center of a spotlight reflected from the mirror 1.

FIG. 8 shows the relationship between the amplitude $A_X$ of the sinusoidal-wave drive voltages $V_{xa}$ and $V_{xb}$ and the deflection angle $\theta_x$ of the mirror 1 of FIGS. 3A and 3B, FIGS. 4A and 4B, FIGS. 5A and 5B, FIGS. 6A and 6B, and FIGS. 7A and 7B.

As shown in FIG. 8, in the case of the optical deflector defined by FIGS. 3A and 3B (Prior Art), when the amplitude $A_X$ of the sinusoidal-wave drive voltages $V_{xa}$ and $V_{xb}$ was about 6V and the deflection angle $\theta_x$ was about 8°, the mirror 1 or the torsion bar 3-1 at the coupling region C broke down. On the other hand, in the case of the optical deflector defined by FIGS. 4A and 4B, when the amplitude $A_X$ of the sinusoidal-wave drive voltages $V_{xa}$ and $V_{xb}$ was about 10V and the deflection angle $\theta_x$ was about 12°, the mirror 1 or the torsion bar 3-1 at the coupling region C broke down. Also, in the case of the optical deflector defined by FIGS. 5A and 5B or FIGS. 6A and 6B, when the amplitude $A_X$ of the sinusoidal-wave drive voltages $V_{xa}$ and $V_{xb}$ was about 12V and the deflection angle $\theta_x$ was about 14°, the mirror 1 or the torsion bar 3-1 at the coupling region C broke down. Further, in the case of the optical deflector defined by FIGS. 7A and 7B, when the amplitude $A_X$ of the sinusoidal-wave drive voltages $V_{xa}$ and $V_{xb}$ was about 15V and the deflection angle $\theta_x$ was about 17°, the mirror 1 or the torsion bar 3-1 at the coupling region C broke down. Thus, the endurance characteristics of the optical deflectors according to the presently disclosed subject matter can remarkably be improved.

Figure 9:
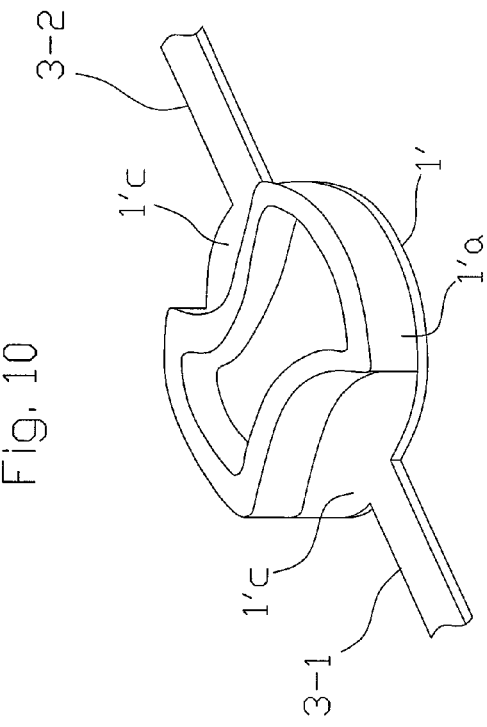
FIG. 9 is a perspective view illustrating a modification of the mirror and torsion bars defined by FIGS. 4A and 4B.

When the mirror 1 is circular, the mirror 1 defined by FIGS. 4A and 4B is modified into a circular mirror 1' as illustrated in FIG. 9 where a recess 1'b corresponding to the recess 1b of FIGS. 4A and 4B is formed within a circular rib 1'a formed on the mirror 1'.

Figure 10:
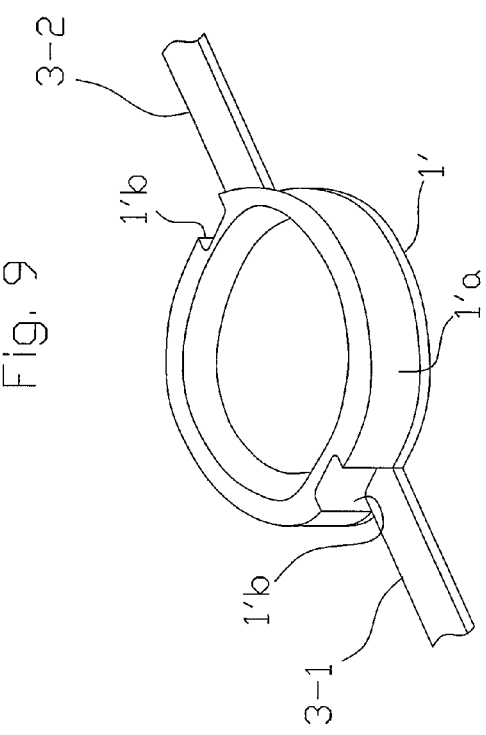
FIG. 10 is a perspective view illustrating a modification of the mirror and torsion bars defined by FIGS. 5A and 5B.

Also, when the mirror 1 is circular, the mirror 1 defined by FIGS. 5A and 5B is modified into a circular mirror 1' as illustrated in FIG. 10 where a recess 1'c corresponding to the recess 1c of FIGS. 5A and 5B is formed within a circular rib 1'a formed on the mirror 1'.

Figure 11:
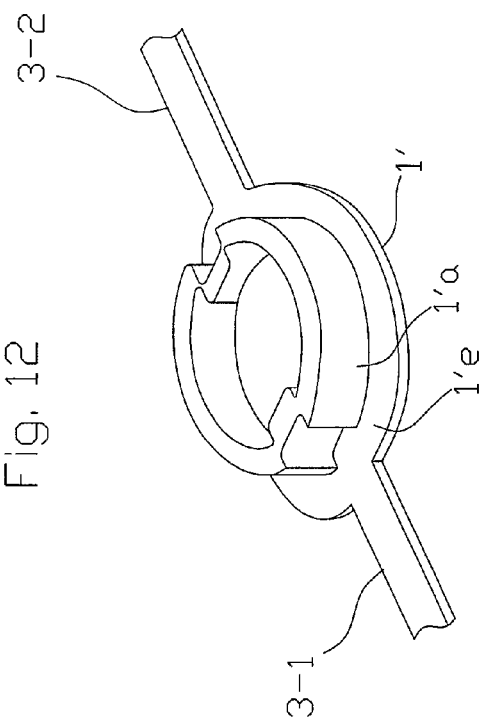
FIG. 11 is a perspective view illustrating a modification of the mirror and torsion bars defined by FIGS. 6A and 6B.

Further, when the mirror 1 is circular, the mirror 1 defined by FIGS. 6A and 6B is modified into a circular mirror 1' as illustrated in FIG. 11 where a recess 1'd corresponding to the recess 1d of FIGS. 6A and 6B is formed within a circular rib 1'a formed on the mirror 1'.

Figure 12:
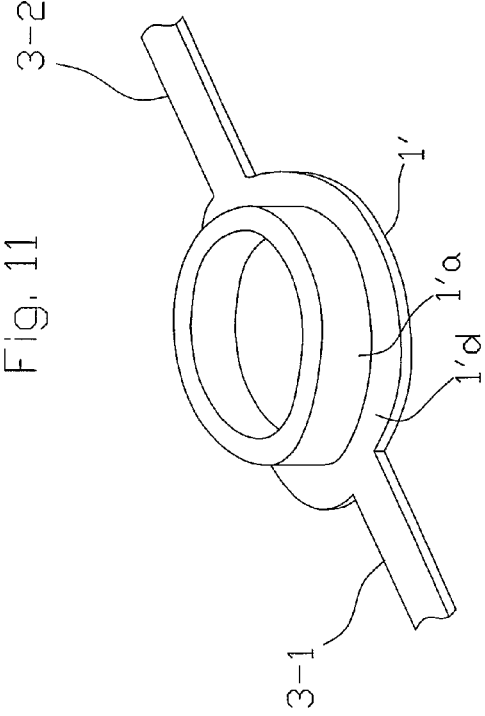
FIG. 12 is a perspective view illustrating a modification of the mirror and torsion bars defined by FIGS. 7A and 7B.

Still further, when the mirror 1 is circular, the mirror 1 defined by FIGS. 7A and 7B is modified into a circular mirror 1' as illustrated in FIG. 12 where a recess 1'e corresponding to the recess 1e of FIGS. 7A and 7B is formed within a circular rib 1'a formed on the mirror 1'.

According to FIGS. 9, 10, 11 and 12, the spread of a relatively large stress from the torsion bars 3-1 and 3-2 into mirror 1' is suppressed by the rib 1'a; however, such a relatively large stress is still spread into the mirror 1' due to the presence of the recess 1'b, 1'c, 1'd or 1'e within the rib 1'a.

Figure 13:
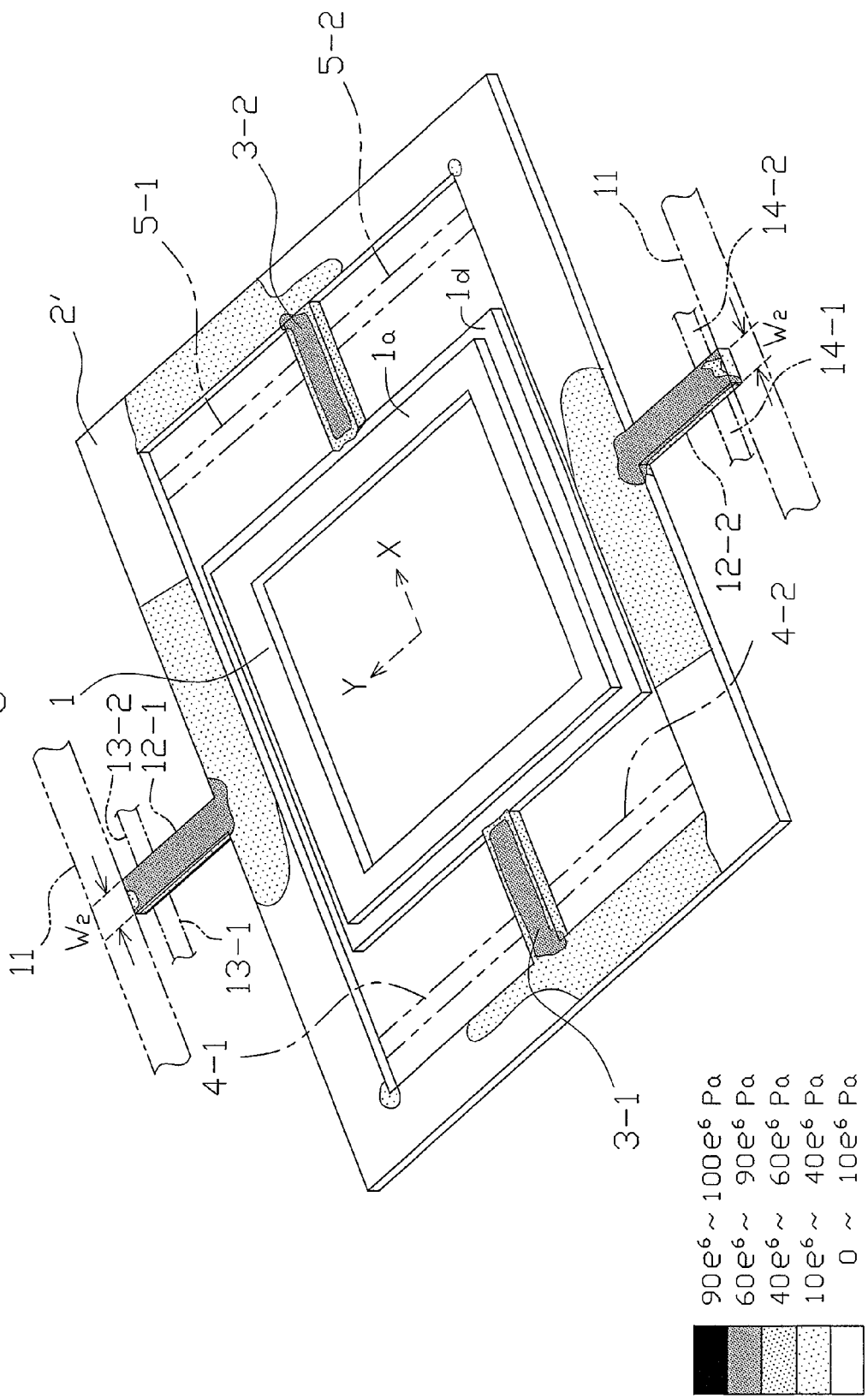
FIG. 13 is a perspective view illustrating a fifth embodiment of the optical deflector according to the presently disclosed subject matter with a simulated stress distribution.
Figure 14:
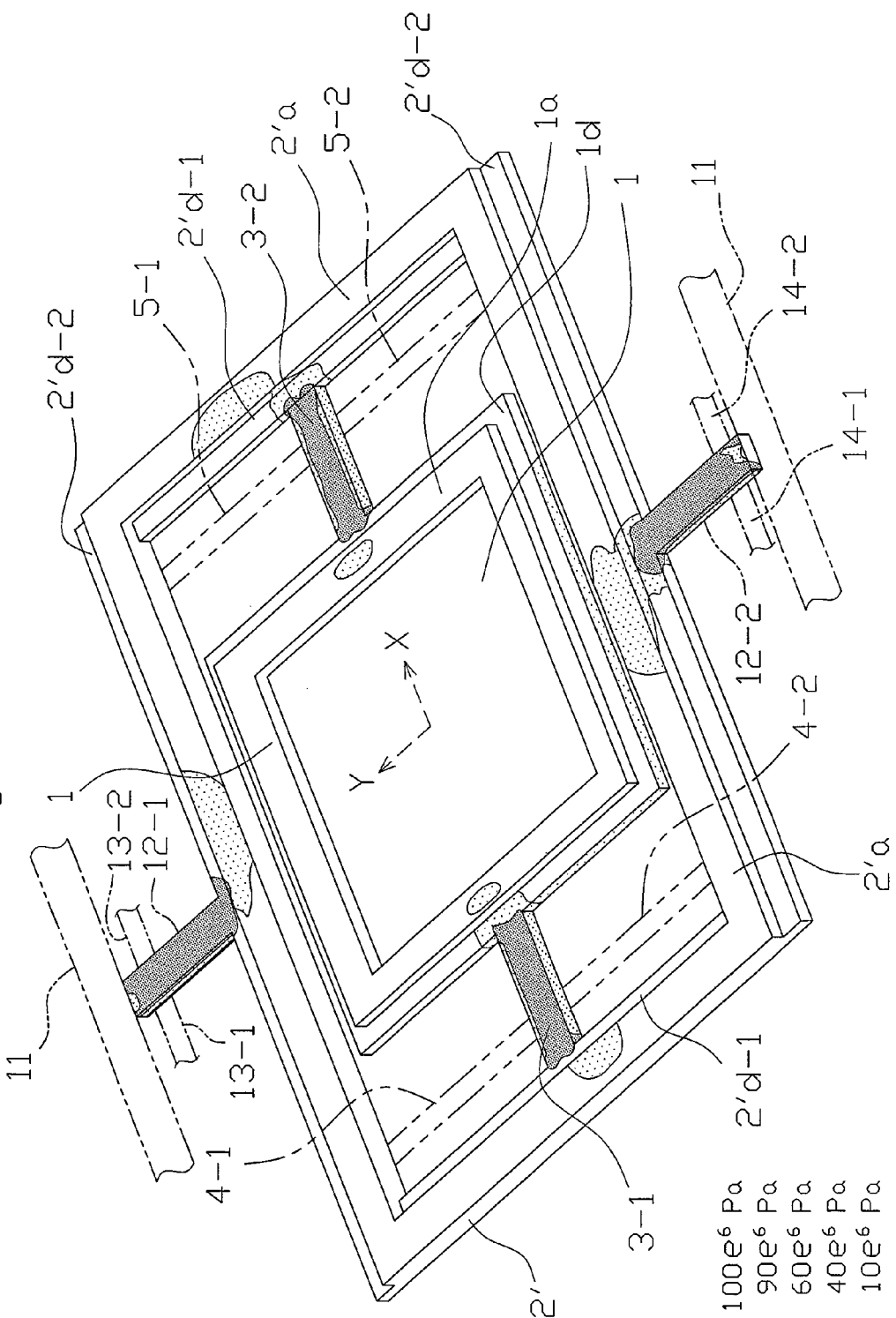
FIG. 14 is a perspective view illustrating a sixth embodiment of the optical deflector according to the presently disclosed subject matter with a simulated stress distribution.

The presently disclosed subject matter can be applied to a two-dimensional optical deflector as illustrated in FIGS. 13 and 14.

In FIG. 13, which illustrates a fifth embodiment of the optical deflector according to the presently disclosed subject matter, an inner support frame 2' having the same thickness as that of the mirror 1 and the torsion bar 3-1 and 3-2 is provided instead of the support frame 2 of FIG. 1.

Also, in addition to the elements of FIG. 1, an outer support frame 11 surrounding the inner support frame 2', a pair of torsion bars 13-1 and 13-2 connected between the outer support frame 11 and the inner support frame 2', two pairs of piezoelectric actuators 13-1, 13-2 and 14-1, 14-2 provided between the outer support frame 11 and the inner support frame 2' for rocking the mirror 1 through the torsion bars 12-1 and 12-2 with respect to the Y-axis are provided. In this case, the thickness of the inner support frame 2' is the same as that of the torsion bars 12-1 and 12-2 while the outer support frame 11 is thicker than the torsion bars 12-1 and 12-2.

Provided on the mirror 1 is the rib 1a and the recess 1d formed on the outer circumference of the rib 1a in the same way as in FIGS. 6A and 6B.

When a simulation using the Oofelie-Multiphysics V4.4 (trademark) simulation software provided by Open Engineering was performed upon the optical deflector of FIG. 13, a stress distribution as illustrated in FIG. 13 was obtained. The spread of a relatively large stress into the mirror 1 is suppressed by the rib 1a; however, such a relatively large stress is still spread isotropically into the mirror 1 at the recess 1d mainly along the Y-axis due to the presence of the recess 1d within the rib 1a. Even in this case, Condition I (or II) and Condition III were satisfied.

Therefore, the mirror 1 and the torsion bar 3-1 at their coupling region would not break down even when the deflection angle of the mirror 1 is large.

On the other hand, the thickness of the inner support frame 2' is the same as that of the torsion bars 3-1 and 3-2, i.e., very thin. Therefore, a relatively large stress was spread isotropically and broadly from the torsion bars 3-1 and 3-2 and the torsion bars 12-1 and 12-2 into the inner support frame 2' along the X-axis and the Y-axis due to the thin structure thereof. As a result, the inner support frame 2' per se would warp, and at worst, the inner support frame 2' would break down entirely.

In FIG. 13, note that the recess 1b of FIGS. 4A and 4B, the recess 1c of FIGS. 5A and 5B or the recess 1e of FIGS. 7A and 7B can be formed within the rib 1a of FIG. 13 instead of the recess 1d of FIGS. 6A and 6B.

In FIG. 14, which illustrates a sixth embodiment of the optical deflector according to the presently disclosed subject matter, a rib 2'a is provided on the inner support frame 2'. Also, the recesses 2'd-1 similar to the recess 1d of FIGS. 6A and 6B are formed on inner circumferences of the inner support frame 2' on the sides of the torsion bars 3-1 and 3-2. Further, the recesses 2'd-2 similar to the recess 1d of FIGS. 6A and 6B are formed on outer circumferences of the inner support frame 2' on the sides of the torsion bars 12-1 and 12-2. Note that the recess 2'd-1 has a larger width than the width $W_1$ of the torsion bars 3-1 and 3-2, and the recess 2'd-2 has a larger width than the width $W_2$ of the torsion bars 12-1 and 12-2. Also, the lengths of the recesses 2'd-1 and 2'd-2 are not large.

When a simulation using the Oofelie-Multiphysics V4.4 (trademark) simulation software provided by Open Engineering was performed upon the inner support frame 2', the torsion bars 3-1 and 3-2 and the torsion bars 12-1 and 12-2 of the optical deflector of FIG. 14, a stress distribution as illustrated in FIG. 14 was obtained. The spread of a relatively large stress from the torsion bars 3-1 and 3-2 and the torsion bars 12-1 and 12-2 into the inner support frame 2' is suppressed by the thick rib 2'a; however, such a relatively large stress is spread into the inner support frame 2' at the recesses 2'd-1 and 2'd-2 to the presence of the recesses 2'd-1 and 2'd-2 in the rib 2a. Even in this case, Condition I (or II) and Condition III were satisfied. Therefore, the inner support frame 2' and the torsion bars 3-1 and 3-2, 12-1 and 12-2 at their coupling region would not break down even when the deflection angle of the inner support frame 2' is large.

Figure 15:
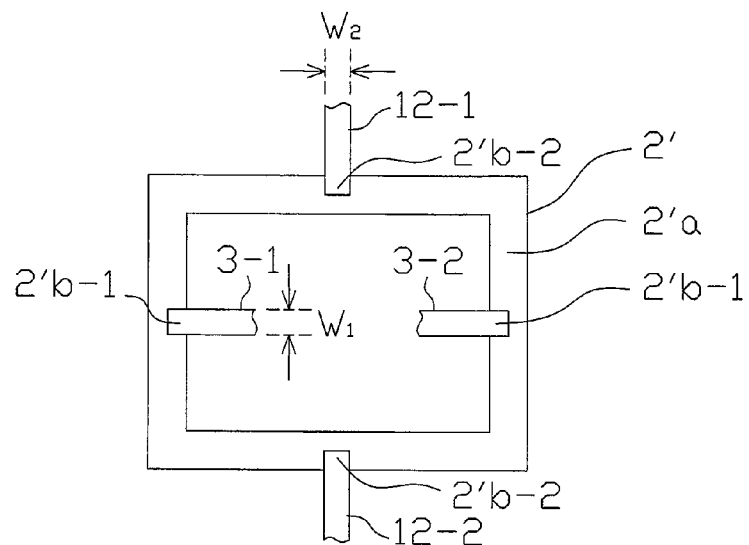
FIGS. 15, 16 and 17 are plan views illustrating modifications of the outer support frame of FIG. 14.

As illustrated in FIG. 15, recesses 2'b-1 and 2'b-2 similar to the recess 1b of FIGS. 4A and 4B can be formed within the rib 2'a of FIG. 14. In this case, the recess 2'b-1 has the same width as the width $W_1$ of the torsion bars 3-1 and 3-2, and the recess 2'b-2 has the same width as the width $W_2$ of the torsion bars 12-1 and 12-2.

Figure 16:
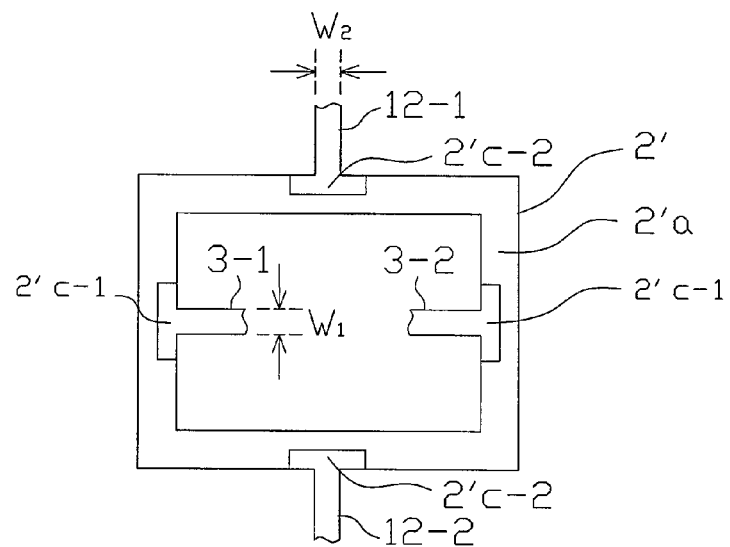

Also, as illustrated in FIG. 16, recesses 2'c-1 and 2'c-2 similar to the recess 1c of FIGS. 5A and 5B can be formed within the rib 2'a of FIG. 14. In this case, the recess 2'c-1 has a larger width than the width $W_1$ of the torsion bars 3-1 and 3-2, and the recess 2'c-2 has a larger width than the width $W_2$ of the torsion bars 12-1 and 12-2.

Figure 17:
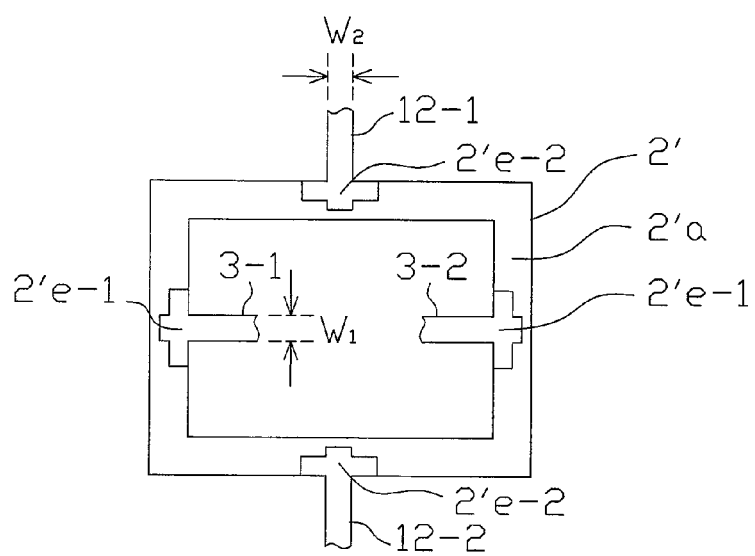

Further, as illustrated in FIG. 17, recesses 2'e-1 and 2'e-2 similar to the recess 1e of FIGS. 7A and 7B can be formed within the rib 2'a of FIG. 14. In this case, the recess 2'c-1 has a larger width than the width $W_1$ of the torsion bars 3-1 and 3-2, and the recess 2'e-2 has a larger width than the width $W_2$ of the torsion bars 12-1 and 12-2.

In the above-described embodiments, two torsion bars are provided for the X-axis of the mirror 1; however, a single torsion bar can be provided for the X-axis of the mirror 1. Also, two torsion bars are provided for the Y-axis of the mirror 1 or 1'; however, a single torsion bar can be provided for the Y-axis of the mirror 1 or 1'.

Also, in the above-described embodiments, the piezoelectric actuators 4-1, 4-2, 5-1 and 5-2 are linear; however, these piezoelectric actuators can be semi-ring-shaped if the mirror is circular.

Further, the piezoelectric actuators can be other actuators such as electrostatic actuators or electromagnetic actuators.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. An optical deflector comprising:
    a mirror;
    a first rib formed at an outer circumference of said mirror;
    a first support frame surrounding said mirror;
    at least one first torsion bar arranged along a first axis of said mirror and coupled between said first support frame and said mirror;
    a pair of first actuators arranged between said first support frame and said first torsion bar; and
    a first recess immediately adjacent to said first torsion bar, the first recess being formed within said first rib.

2. The optical deflector as set forth in claim 1, wherein said first recess has a width larger than a width of said first torsion bar.

3. The optical deflector as set forth in claim 2, wherein a first length of said first recess along the first axis of said mirror at a portion of said first recess provided immediately adjacent to said first torsion bar is larger than a second length of said first recess along the first axis of said mirror at a portion of said first recess which is provided at an outer circumference of said first rib and which is not immediately adjacent to said first torsion bar.

4. The optical deflector as set forth in claim 1, wherein said first recess has a same width as a width of said first torsion bar.

5. The optical deflector as set forth in claim 1, further comprising:
    a second support frame surrounding said first support frame;
    a second rib formed on said second support frame;
    at least one second torsion bar arranged along a second axis of said mirror perpendicular to said first axis and coupled between said second support frame and said first support frame; and
    a pair of second actuators arranged between said second support frame and said second torsion bar,
    wherein a second recess immediately adjacent to said first torsion bar is formed within said second rib, and a third recess immediately adjacent to said second torsion bar is formed within said second rib.

6. The optical deflector as set forth in claim 5, wherein said second recess has a width larger than a width of said first torsion bar.

7. The optical deflector as set forth in claim 5, wherein said third recess has a width larger than a width of said second torsion bar.

8. The optical deflector as set forth in claim 6, wherein said second recess has a larger length at a portion thereof immediately adjacent to said first torsion bar than at a portion thereof not immediately adjacent to said first torsion bar.

9. The optical deflector as set forth in claim 7, wherein said third recess has a larger length at a portion thereof immediately adjacent to said second torsion bar than at a portion thereof not immediately adjacent to said second torsion bar.

10. The optical deflector as set forth in claim 5, wherein said second recess has a same width as a width of said first torsion bar.

11. The optical deflector as set forth in claim 5, wherein said third recess has a same width as a width of said second torsion bar.

* * * * *